United States Patent

[11] 3,564,336

[72] Inventors Paul Buergi
Wil-Turgi;
Rolf Schaumann, Neuenhof, Switzerland
[21] Appl. No. 856,379
[22] Filed Sept. 9, 1969
[45] Patented Feb. 16, 1971
[73] Assignee Aktiengesellschaft Brown Boveri & Cie
Baden, Switzerland
a joint stock company
[32] Priority Oct. 15, 1968
[33] Switzerland
[31] 15392

[54] SEQUENTIAL SWITCHING SYSTEM WITH CURRENT LIMITING SHUNT PATH
3 Claims, 1 Drawing Fig.
[52] U.S. Cl. .................................................. 317/11,
317/60; 307/133
[51] Int. Cl. .................................................. H02h 3/00
[50] Field of Search ........................................... 317/11, 60,
58; 307/133

[56] References Cited
UNITED STATES PATENTS
3,401,303  9/1968  Walker ........................  317/11

Primary Examiner—J. D. Miller
Assistant Examiner—Harvey Fendelman
Attorney—Scheffler & Parker Pierce ABSTRACT: An electrical switching system of the type which includes a main power switching point, an auxiliary switching point connected in parallel with the main switching point through a secondary circuit which includes a series resistance, and a voltage-isolating switching point connected in series with the main switching point. Upon application of a switching-on order, current is caused to flow only through the secondary path containing the series-connected auxiliary switching point and resistance, and also the voltage-isolating switching point which is now closed in order to test the condition of the circuit. If the current flow is abnormally high, the auxiliary switching point is opened and the voltage-isolating switching point is reopened. Thus, there is no current flow through the main power switching point during the test period and this main switching point closes to complete the switching-on order only in the event that the current flow in the circuit is normal.

PATENTED FEB 16 1971
3,564,336
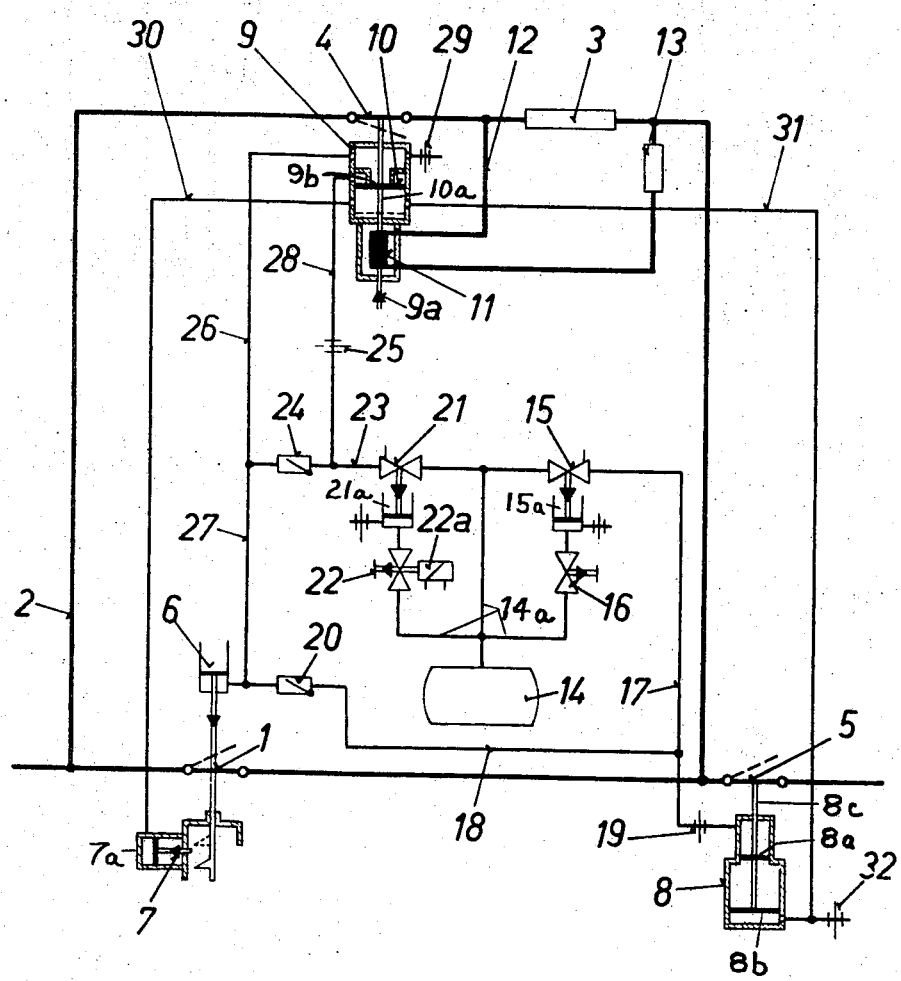
Inventors
Paul Bürgi
Rolf Schaumann
By Pierce, Scheffler & Parker
Attorneys

SEQUENTIAL SWITCHING SYSTEM WITH CURRENT LIMITING SHUNT PATH

The present invention relates to an improvement in a switching system of the general type which includes at least one main switching point at which the power current flowing in the circuit controlled by the switch is interrupted, a secondary branch circuit connected in parallel with the main switching point, this branch circuit including a resistance connected in series with an auxiliary switching point, and a voltage-isolating switching point connected in series with the main switching point, and which is arranged to be opened subsequent to opening of the main and auxiliary switching points. The main and auxiliary switching points are usually constituted by switching devices operating on the gas-blast principle whereas the series-connected voltage-isolating switching point can take a more simple structural form of a blade-type switch i.e. it need not possess any appreciable current-interrupting capacity since the main load current is interrupted at the main switching point and the residual current flowing through the resistance component in the branch circuit is interrupted by the auxiliary switching point.

A switching-on operation, meaning a connection of two circuits or plant sections which are connected to the switching system at either side, is performed according to the layout of the main switching point, either through the main switching point itself or through the series i.e. the voltage isolation switching point if the main switching point is arranged as a socalled impulse switching point which opens only momentarily during a switching-off operation, and closes again as soon as the series switching point has been opened. In the event of a fault, e.g. if a short circuit is present in the circuit section desired to be switched on, or when two circuit sections are conjointly switched asynchronously (phase opposition), substantial initial currents can arise, and the corresponding switching point must be able to withstand them. Accordingly, the switching components and their appertaining contact actuating mechanisms must be relatively complex and costly.

The principal object of the present invention is to provide an improved switching system of the general type referred to wherein the main and auxiliary switching points may be constituted by switching devices which are not required to have a high switching-on capacity. According to the invention, this result is achieved by incorporating means for engendering an action, in the case of switching on to a faulty circuit section, such that a flow of current can arise only through the secondary path in parallel with the main switching point, that such current is interrupted immediately at the auxiliary switching point, and that the series-connected voltage isolating switching point is then automatically actuated to its switched-off open position. In this manner, a possible fault current cannot build up to its full peak in the secondary path due to the presence of the resistance component included in that path, and the circuit is interrupted again as soon as the condition of the circuit is not proper.

The invention will be further described in detail in relation to an exemplary embodiment thereof and which is shown schematically in the single view of the accompanying drawing.

With reference now to the drawing, the main switching point is indicated at 1 and may be constituted by a switching contact mechanism of the well-known gas-blast type. Connected in parallel with the main switching point 1 is a secondary electrical path 2 which contains a resistance 3 connected in series with an auxiliary switching point 4 which also may be constituted by a switching contact mechanism of the gas blast type. A further switching point 5 connected in series with the main switching point 1 serves as a voltage isolating point which normally remains in a switched-off position after the main switching point has been interrupted thus to isolate the circuits for each other, and this switching structure for point 5 need not be of the gas-blast type.

The main switching point 1 includes a pneumatically operated contact actuating mechanism 6 as well as pneumatically operated locking device 7 which functions to lock the contacts of the main switching point 1 in their open position, i.e. the position shown in dotted line. The series-connected switching point 5 also includes a pneumatically operating contact actuating mechanism 8 comprising a stepped cylinder within which two pistons 8a, 8b of different diameters function respectively to actuate a common piston rod 8c. The smaller piston 8a is utilized for a switching-on operation, i.e. closing the switching point 5 by movement of piston rod 8c in one direction, and the larger piston 8b is utilized for a switching-off operation of point 5 by moving piston rod 8c in the opposite direction. The space within the cylinder between the two pistons is suitably ventilated continuously to atmosphere.

The auxiliary switching point 4 also includes a pneumatic contact actuating mechanism 9 which includes a piston 10 and piston rod 10a operating within a pneumatic cylinder the interior of which is divided by a valve seat 9b of reduced diameter, the piston 10 serving also to close off the valve seat when in a position in which the switching point 4 has been closed by movement of piston rod 10a. In addition to a resetting mechanism 9a coupled to piston rod 10a, the contact actuating mechanism 9 includes a supplementary mechanism in the form of an electromagnet coil 11 surrounding the piston rod 10a and which acts upon an armature, not shown, within the coil and which is connected to piston rod 10a. Coil 11 is electrically connected in parallel with resistance component 3 by means of a connection circuit 12 which includes a current-limiting resistance component 13 serves as the source for energizing coil 11 which includes the resistance 13 in series therewith.

A storage tank 14 for compressed gas is included to provide the pressurized gas which is necessary to operate the pneumatic contact actuating mechanisms 6, 8 and 9 previously described.

For performing a switching-on operation, a control valve 16, which may be manually operated, is provided to control flow of compressed gas from an outlet line 14a from tank 14 to a pneumatically operated (piston-cylinder mechanism 15a) which in turn controls a switching-on valve 15 which when opened serves to permit flow of compressed gas from an outlet line 14a through a line 17 and throttling device 19 placed therein to the smaller cylinder space above the smaller piston 8a in the actuator 8 correlated to the series switching point 5. A branch line 18 leads from line 17 ahead of the throttling device 19 through a check valve 20 to the pneumatically operated actuating device 6 for the main switching point 1.

For performing a switching-off operation, a control valve 22, which may be operated manually, and also remotely by means of an electromagnetic drive 22a, is provided to control flow of compressed gas from an outlet line 14a from tank 14 to a pneumatically operated (piston-cylinder mechanism 21a) which in turn controls a switching-off valve 21 which, when opened, serves to permit flow of compressed gas from an outlet line 14a through a line 23, check valve 24 and line 27 to the pneumatically operated actuating device for the main switching point 1. Compressed gas also flows from line 23, check valve 24 and line 26 to the cylinder space above piston 10 of the pneumatically operated actuating device 9 for the auxiliary switching point 4.

Moreover, a line 28 branched from line 23 leads through a throttling device 25 to an annular space in the cylinder between piston 10 and the valve seat 9b. The space within the cylinder above the valve seat 9b is vented to atmosphere through a throttling device 29. The space within the cylinder below piston 10 is connected through a line 30 to the pneumatic actuator 7a for the locking device 7 and also through line 31 to the space within the cylinder below the larger piston 8b of the actuating mechanism 8 for the series-connected switching point 5, this space being vented to atmosphere through a throttling device 32.

The improved switching system operates in the following manner. In a switched-off condition of the switching system, the switching points 1 and 4 are closed, solid line position and the switching point 5 is open, i.e. the dotted line position.

In this connection it should be explained that the circuit breaker structures used for the switching points 1 and 4 are of the well-known type where in a switching-out operation, their contacts open to perform their switching functions and then reclose, after the switching structure constituting the voltage isolation switching point has opened.

When it is desired to perform a switching-on operation, the control valve 16 is switched to its on position thus effecting an opening of valve 15 by way of its pneumatic actuator 15a, which causes the compressed gas from storage tank 14 to pass, without delay through lines 17, 18 and check valve 20 to pneumatic actuator 6 thereby temporarily opening the switching point 1. At the same time, compressed gas passes into line 27 which is tapped to line 18 intermediate check valve 20 and actuator 6 and flows through line 27 and line 26 which connects with the former, into the space above piston 10 of actuator 9. Due to the presence of the throttling point 19, line 17 also fills the space above the smaller piston 8a of actuator 8 with compressed gas after a certain time delay as determined by the design of the throttling point 19, so that the series-connected switching point 5 does not close until the main switching point 1 has been opened. With the closing of switching point 5 and, according to the condition of the switched-on circuit section, a flow of current can occur in the secondary path 2 since the auxiliary switching point 4 initially remains closed, this for the reason that the compressed gas working on piston 10 from above acts only upon a partial, central area of the piston because of the valve seat 9a, and the force resulting therefrom cannot overcome a counterforce of the resetting system 9a which may, for example, be constituted by a spring. If a switching-on current exceeding, for example, twice the rated load is induced to flow in the secondary path 2, the force acting complementarily on actuator 9 by means of the magnet coil 11 is apt to open the auxiliary switching point 4. This causes compressed gas to be fed by way of lines 30 and 31 so that the locking device 7 operated by pneumatic actuator 7a fed over line 30, prevents the closing of the main switching point 1, and the switching point 5 is opened by application of compressed gas fed over line 31 to the piston 8b of actuator 8. In this manner, the current flow appearing upon switching on to a faulty circuit section is interrupted at the auxiliary switching point 4 and the switching system is placed in a switched-off condition by automatic opening of the series switching point 5 without a current appearing at the main switching point 1. If no fault current appears, however, upon switching on, the auxiliary switching point 4 and the series-connected voltage isolating switching point 5 are not opened. After cessation of a switching-on order, lines 26, 27 and 31 are vented through the throttling devices 29 and 32, thus closing the main switching point 1.

During a switching-off operation, the main switching point 1 always opens first, as soon as the valves 21, 22 are opened. A flow of current appears in the secondary path 2 after the opening of the switching point 1. In case of a fault, coil 11 functions to open the auxiliary switching point 4 in a manner analogous to that described in connection with a switching-on operation. Otherwise, compressed gas also passes through the throttling point 25 and line 28 to the annular outer and upper surface of piston 10 as well, thereby overcoming the counterforce of the resetting system 9a and causing the auxiliary switching point 4 to open. The opening of the series switching point 5, and the reclosing of the main switching point 5 thereafter occur in a manner analogous to that previously described.

We claim:

1. In a switching system, the combination comprising a main circuit path including first contact means constituting a main switching point, second contact means constituting an auxiliary switching point, a secondary circuit path connecting said auxiliary switching point in parallel with said main switching point through a series-connected resistance, third contact means connected in series with said main switching point in said main circuit path and constituting a voltage isolation switching point, said first and second contact means being closed and said third contact means being open when said system is in a switched-off condition, means responsive to a switching-on order for temporarily opening said first contact means while said second contact means remains closed followed by closure of said third contact means, and means responsive only to flow of an abnormally high switching-on current through said secondary circuit path subsequent to closure of said third contact means for opening said second contact means and for reopening said third contact means while said first contact means are open.

2. A switching system as defined in claim 1 and which further includes means for locking said first contact means in an open position in the event of a flow of an abnormally high current through said secondary path subsequent to a switching-on order.

3. A switching system as defined in claim 1 wherein said means responsive to flow of an abnormally high current through said secondary circuit path for opening said second contact means is constituted by electromagnetic means energized in accordance with the amplitude of the current flow in said secondary circuit path.